(12) United States Patent
Kaneko

(10) Patent No.: US 7,055,253 B2
(45) Date of Patent: Jun. 6, 2006

(54) SURVEYING INSTRUMENT

(75) Inventor: Kenji Kaneko, Tokyo (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/689,843

(22) Filed: Oct. 22, 2003

(65) Prior Publication Data
US 2004/0163266 A1 Aug. 26, 2004

(30) Foreign Application Priority Data
Oct. 25, 2002 (JP) .............................. 2002-310456

(51) Int. Cl.
*G01B 11/26* (2006.01)
(52) U.S. Cl. ...................... 33/290; 33/292; 33/DIG. 21
(58) Field of Classification Search .................. 33/290, 33/291, 292, 286, DIG. 21; 356/4.01, 139.1, 356/141.1, 141.2, 141.4, 147
See application file for complete search history.

(56) References Cited

U.S. PATENT DOCUMENTS

| | | | |
|---|---|---|---|
| 5,313,409 A | 5/1994 | Wiklund et al. ............ 356/4.01 |
| 6,046,800 A * | 4/2000 | Ohtomo et al. ........... 356/141.1 |
| 6,462,810 B1* | 10/2002 | Muraoka et al. ........ 356/139.04 |
| 6,473,166 B1* | 10/2002 | Ohishi et al. ............. 356/141.1 |
| 6,487,011 B1* | 11/2002 | Donath et al. .............. 359/399 |
| 6,504,602 B1* | 1/2003 | Hinderling ................... 356/5.1 |
| 6,957,493 B1* | 10/2005 | Kumagai et al. .............. 33/290 |
| 2003/0048355 A1* | 3/2003 | Shimoyama et al. ......... 348/79 |
| 2003/0179361 A1* | 9/2003 | Ohtomo et al. ............ 356/4.01 |
| 2004/0090612 A1* | 5/2004 | Kaneko et al. ............ 356/4.01 |

FOREIGN PATENT DOCUMENTS

JP       3039801       3/2000

* cited by examiner

*Primary Examiner*—R. Alexander Smith
(74) *Attorney, Agent, or Firm*—Greenblum & Bernstein, P.L.C.

(57) ABSTRACT

A surveying instrument includes a surveying instrument body rotatable about each of a vertical axis and a horizontal axis; and a first collimator optical system and a second collimator optical system each of which is positioned in the surveying instrument body to collimate the surveying instrument relative to a survey point, a viewing angle of the second collimator optical system being smaller than a viewing angle of the first collimator optical system. A first collimating operation is performed with the first collimator optical system before a second collimating operation is performed with the second collimator optical system.

11 Claims, 7 Drawing Sheets

SURVEYING INSTRUMENT

BACKGROUND OF THE INVENTION

1. Field of the Invention

The present invention relates to a surveying instrument, more specifically to a surveying instrument having a collimator optical system for collimating the surveying instrument through a telescope optical system having a narrow viewing angle.

2. Description of the Related Art

In conventional surveying instruments having a collimator and a telescope optical system for sighting a survey point, a collimator optical system branches from the telescope optical system.

However, the viewing angle of the telescope optical system is generally small (e.g., approximately one and a half degrees). Due to this small viewing angle, with such a collimator optical system, the surveying instrument must be collimated relative to a survey point (e.g., a corner cube) by sequential-scanning of the field-of-view of the collimator optical system while shifting the field-of-view of the collimator optical system due to the field-of-view of the collimator optical system being narrow. Accordingly, a collimating operation takes a long time in conventional surveying instruments.

SUMMARY OF THE INVENTION

According to an aspect of the present invention, a surveying instrument is provided, including a surveying instrument body rotatable about each of a vertical axis and a horizontal axis; and a first collimator optical system and a second collimator optical system each of which is positioned in the surveying instrument body to collimate the surveying instrument relative to a survey point, a viewing angle of the second collimator optical system being smaller than a viewing angle of the first collimator optical system. A first collimating operation is performed with the first collimator optical system before a second collimating operation is performed with the second collimator optical system.

In another embodiment, a surveying instrument is provided, including a surveying instrument body rotatable about each of a vertical axis and a horizontal axis; and a collimator optical system which is positioned in the surveying instrument body to collimate the surveying instrument relative to a survey point. The collimator optical system includes a zoom mechanism for varying a focal length of the collimator optical system.

In an embodiment, a surveying instrument including a surveying instrument body rotatable about each of a vertical axis and a horizontal axis; a telescope optical system positioned in the surveying instrument body; a collimator optical system positioned in the surveying instrument body, a viewing angle of the collimator optical system being greater than a viewing angle of the telescope optical system. The surveying instrument body is driven to rotate about each of the vertical axis and the horizontal axis to position an image of a target at a survey point within a field-of-view of the telescope optical system in accordance with positional information on the survey point which is obtained through the collimator optical system.

It is desirable for the surveying instrument to include an image sensor. The second collimator optical system is capable of forming an image on the image sensor.

It is desirable for the surveying instrument to include an auto-collimating system which drives the surveying instrument body to rotate about each of the vertical axis and the horizontal axis to position an image of a target at the survey point within a field-of-view of the first collimator optical system.

It is desirable for the first collimator optical system and the second collimator optical system to share the use of the image sensor.

It is desirable for the first collimator optical system to include an all-directional mirror.

It is desirable for each of the first collimator optical system and the second collimator optical system to include a light source for projecting light rays toward the survey point to collimate the surveying instrument relative to the survey point.

It is desirable for the surveying instrument to include an image sensor; and an auto-collimating system which drives the surveying instrument body to position the image of the target at the survey point within a field-of-view of the telescope optical system in accordance with positional information on the survey point which is obtained through the collimator optical system.

It is desirable for the collimator optical system to be positioned to be capable of forming the image of the target on the image sensor.

According to a surveying instrument to which the present invention is applied, the time necessary for a collimating operation can be reduced with a collimator optical system having a wide viewing angle, together with a telescope optical system; moreover, the time necessary for an auto-collimating operation can be reduced. Furthermore, a survey point can be detected swiftly and collimated precisely by selectively using a telephoto optical system and a wide-angle optical system for detection of the survey point and collimation of the telescope optical system relative to the corner cube.

The present disclosure relates to subject matter contained in Japanese Patent Application No.2002-310456 (filed on Oct. 25, 2002) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
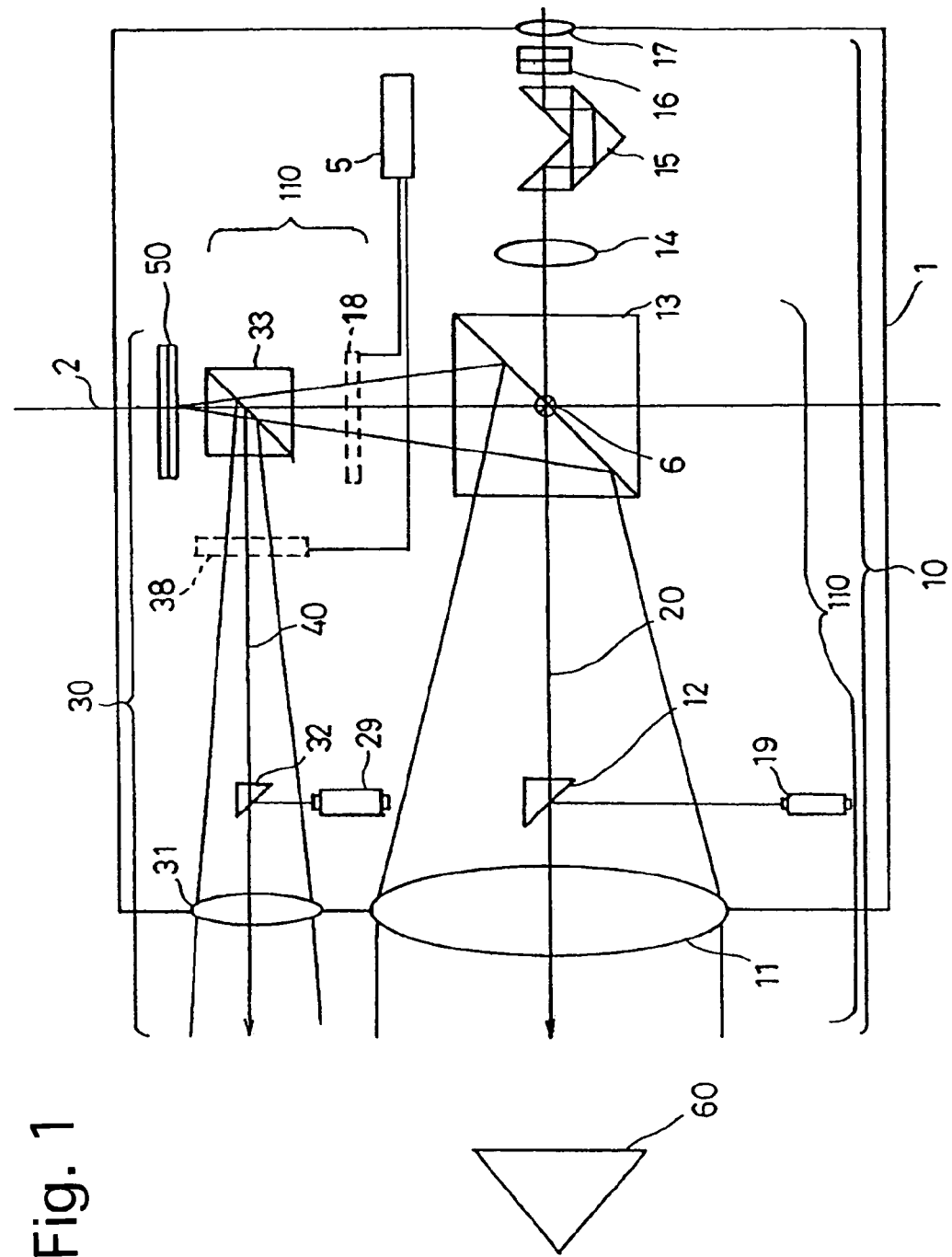
FIG. 1 is a schematic side elevational view of a first embodiment of a surveying instrument according to the present invention.

FIGS. 1 through 4 show a first embodiment of a surveying instrument. As shown in FIG. 1, the surveying instrument is provided with a surveying instrument body 1, a telescope optical system 10, a first collimator optical system 30, and a second collimator optical system 110. Light rays which are firstly projected outwards from a light source 29 inside the surveying instrument body 1 to be incident on a corner cube (survey point) 60 and subsequently reflected back toward the surveying instrument body 1 by the corner cube 60 are received by the first collimator optical system 30 so that the coordinates (e.g., the x and y coordinates) of the corner cube 60 on the image sensor 50 are determined. In accordance with this positional information of the corner cube 60, the surveying instrument body 1 is moved so that an image of the corner cube 60 is positioned within a field-of-view 21 of the telescope optical system 10 (the second collimator optical system 110) to thereby collimate the surveying instrument relative to the corner cube 60.

The first collimator optical system 30 is used to bring light rays reflected by the corner cube 60 into the field-of-view 21 of the telescope optical system 10 or the second collimator optical system 110 prior to a collimating operation through the telescope optical system 10 or the second collimator optical system 110. The first collimator optical system 30 is constructed from an objective lens 31, a right-angle prism 32, the light source 29, a second shutter 38 and a beam splitter (beam splitting prism) 33. The telescope optical system 10 is used to perform a manual collimating operation, and is constructed from an objective lens 11, a light source 19, a right-angle prism 12, a beam splitter (beam splitting prism) 13, a focusing lens 14, a Porro prism 15, a focusing screen 16 and an eyepiece 17. The second collimator optical system 110 is used to perform an auto-collimating operation, and is constructed from the objective lens 11, the light source 19, the right-angle prism 12, the beam splitter 13, a first shutter 18 and the beam splitter (beam splitting prism) 33. Accordingly, the telescope optical system 10 and the second collimator optical system 110 share the use of the objective lens 11, the light source 19, the right-angle prism 12 and the beam splitter 13.

In the telescope optical system 10, the light rays which are firstly incident on the objective lens 11 to enter the surveying instrument body 1 through the objective lens 11 along an optical axis 20 thereof, and subsequently pass through the beam splitter 13, are focused on the focusing screen 16 via the focusing lens 14 and the Porro prism 15 to be viewed, together with a reticle (not shown) formed on the focusing screen 16, through the eyepiece 17. On the other hand, in the second collimator optical system 110, the light rays, which are firstly incident on the objective lens 11 to enter the surveying instrument body 1 through the objective lens 11 along the optical axis 20 thereof and are subsequently reflected at right angles (upwards as viewed in FIG. 1) by the beam splitter 13, pass through the first shutter 18 and the beam splitter 33 to be incident on the image sensor 50.

In the first collimator optical system 30 which is provided independently of the telescope optical system 10, the light rays which are firstly incident on the objective lens 31, to enter the surveying instrument body 1 through the objective lens 31 along an optical axis 40 thereof and subsequently pass through the second shutter 38, are reflected at right angles (upwards as viewed in FIG. 1) by the beam splitter 33 to be incident on the image sensor 50. Accordingly, the image sensor 50 is used to capture both a first image from light rays reflected by the beam splitter 33 and a second image from light rays reflected by the beam splitter 13. A shutter drive system 5 controls the operations of the first and second shutters 18 and 38 so that both the first and second shutters 18 and 38 do not open at the same time. Accordingly, the first and second images are selectively formed on the image sensor 50. Namely, the first and second images are not formed simultaneously on the image sensor 50.

Figure 2:
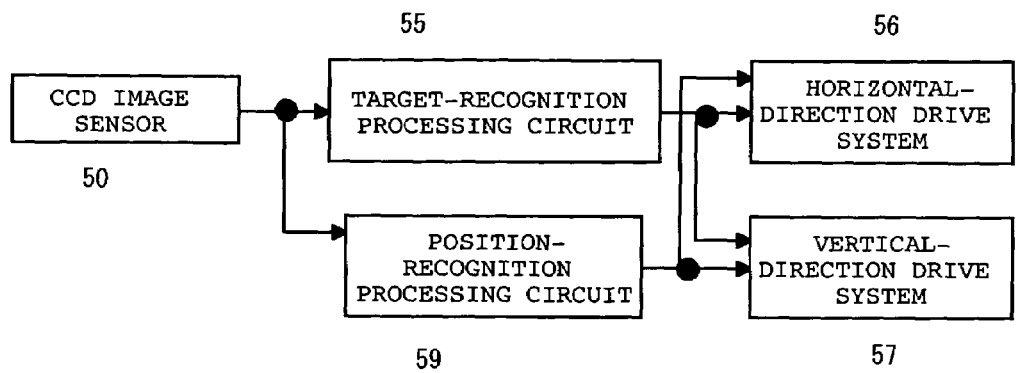
FIG. 2 is a block diagram showing a relationship among an image sensor (CCD), a target recognizing processor, a horizontal-direction drive system, a vertical-direction drive system and a position-recognition processing circuit, all of which are incorporated in the surveying instrument shown in FIG. 1.

As shown in FIG. 2, the first embodiment of the surveying instrument is provided with a target-recognition processing circuit 55, a horizontal-direction drive system 56, a vertical-direction drive system 57 and a position-recognition processing circuit 59, and the target-recognition processing circuit 55 and the position-recognition processing circuit 59 are connected to the image sensor 50. The target-recognition processing circuit 55 determines whether the image sensor 50 receives light rays reflected by the corner cube 60. The target-recognition processing circuit 55 determines that the image sensor 50 receives light rays reflected by the corner cube 60 when an image of the corner cube 60 is positioned within a field-of-view 41 of the first collimator optical system 30. The position-recognition processing circuit 59 determines a deviation of the position of an image of the corner cube 60 in the field-of-view 41 from the center of the field-of-view 41 in accordance with the output of the image sensor 50 (i.e., in accordance with light rays reflected by the corner cube 60) when the target-recognition processing circuit 55 determines that the image sensor 50 receives light rays reflected by the corner cube 60 (i.e., when an image of the corner cube 60 is in the field-of-view 41 of the first collimator optical system 30). If the target-recognition processing circuit 55 determines that the image sensor 50 receives no light rays reflected by the corner cube 60 while the position-recognition processing circuit 59 determines a deviation of the position of an image of the corner cube 60 in the field-of-view 41 from the center of the field-of-view 41, the surveying instrument body 1 is moved by the horizontal-direction drive system 56 and the vertical-direction drive system 57, each of which is connected to each of the target-recognition processing circuit 55 and the position-recognition processing circuit 59.

Figure 3:
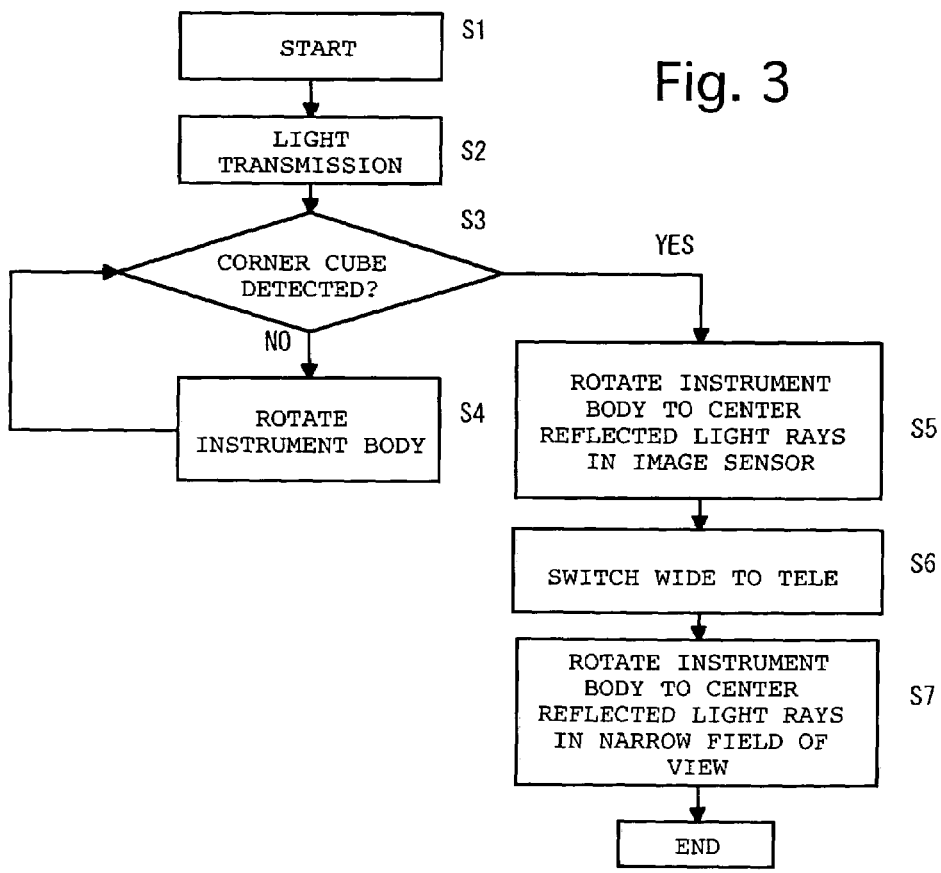
FIG. 3 is a flow chart showing a procedure of a collimating operation performed with the first embodiment of the surveying instrument shown in FIG. 1.

A procedure of a collimating operation performed with the first embodiment of the surveying instrument will be hereinafter discussed with reference to FIG. 3. In this procedure, the corner cube 60 is placed at a survey point (step S1). Subsequently, the image sensor 50 is activated with the first shutter 18 and the second shutter 38 being closed and opened, respectively, and the light source 29 is turned ON to emit light toward the right-angle prism 32 to thereby project light rays toward the corner cube 60 for carrying out a collimating operation (step S2).

If the image sensor 50 receives light rays reflected by the corner cube 60 (if YES at step S3), it is determined that an image of the corner cube 60 is positioned within the field-of-view 41 of the first collimator optical system 30; based on this determination, the position of an image of the reflected light rays on the image sensor 50 is determined. On the other hand, if the image sensor 50 receives no light rays reflected by the corner cube 60 (if NO at step S3), it is determined that no image of the corner cube 60 is positioned within the field-of-view 41 of the first collimator optical system 30;

based on this determination, the surveying instrument body 1 continues to be moved horizontally and vertically until the image sensor 50 receives light rays reflected by the corner cube 60 (step S4). Upon the image sensor 50 receiving light rays reflected by the corner cube 60, the position of the reflected light rays on the image sensor 50 is determined (step S3).

Subsequently, the surveying instrument body 1 is moved horizontally and vertically in accordance with the positional information on the reflected light rays on the image sensor 50 to center the reflected light rays in the image sensor 50 (step S5). Subsequently, the second shutter 38 is closed while each of the light source 29 and the image sensor 50 is turned OFF. This makes it possible to bring light rays reflected by the corner cube 60 (survey point) into the field-of-view 21 of the telescope optical system 10 or the second collimator optical system 110.

Subsequently, a collimating operation is performed with either the telescope optical system 10 or the second collimator optical system 110, not with the first collimator optical system 30 which is used at step S3 to determine whether the image sensor 50 receives light rays reflected by the corner cube 60 (step S6).

This collimating operation, which is performed with either the telescope optical system 10 or the second collimator optical system 110, will be hereinafter discussed.

In the case where the collimating operation is performed manually, an operator rotates the surveying instrument body 1 horizontally and vertically while viewing an image of the corner cube 60 through the eyepiece 17 of the telescope optical system 10 so that the image of the corner cube 60 is positioned in the center of the field-of-view 21 (step S7).

In the case where the collimating operation is performed automatically, first of all, the first shutter 18 is opened, the image sensor 50 is activated, and the light source 19 is turned ON. Subsequently, the position of the reflected light rays of the corner cube 60 on the image sensor 50 which are incident on the image sensor 50 through the second collimator optical system 110 is detected, and the surveying instrument body 1 is rotated horizontally and vertically so that the image of the corner cube 60 is positioned in the center of the field-of-view 21 (step S7).

After the above described manual or automatic collimating operation is completed, a distance from the surveying instrument body 1 to the corner cube 60 and also horizontal and vertical angles can be measured with a position detector (not shown).

Figure 4:
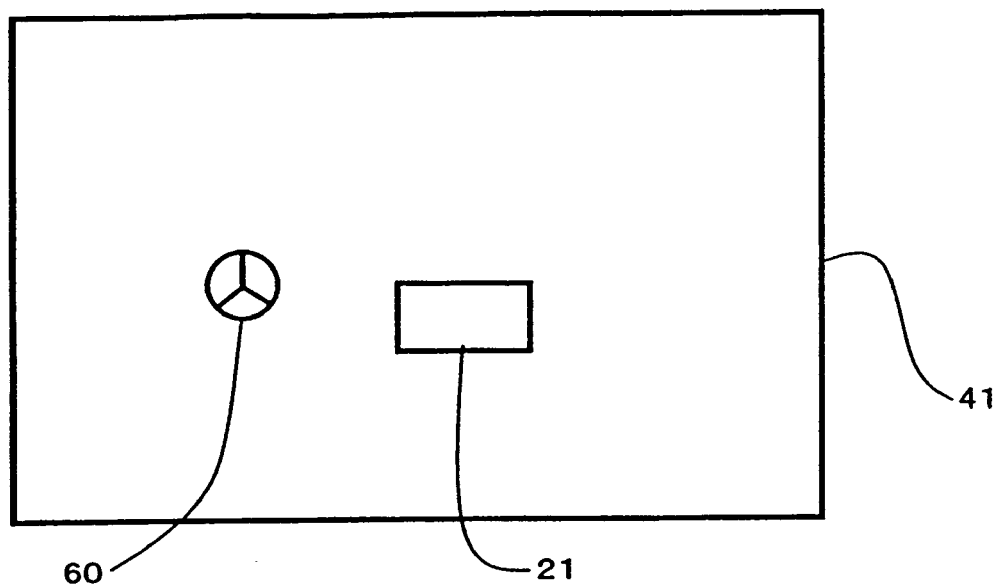
FIG. 4 is a diagram showing a field-of-view of the first embodiment of the surveying instrument.

In the first collimator optical system 30, the viewing angle of the first collimator optical system is set greater than the aforementioned conventional angle of one and a half degrees by designing the first collimator optical system 30 to have a short focal length. Accordingly, an image of the corner cube 60 can be positioned in the field-of-view 41 of the first collimator optical system 30 much easier than the field-of-view 21 since the field-of-view 41 of the first collimator optical system 30 is substantially greater than the field-of-view 21 as shown in FIG. 4. This makes it possible to capture a wide range of viewing field at one time, thus making it possible to achieve a substantial reduction in time necessary for the collimating operation. Namely, the collimating operation can be sped up. Moreover, the view captured during the collimating operation can be recorded in a wide viewing range via the image sensor 50 because of the wide viewing angle of the first collimator optical system 30. Furthermore, the corner cube 60 can be detected swiftly and precisely by selectively using the telephoto optical system (the telescope optical system 10) and the wide-angle optical system (the first collimator optical system 30) for detection of the corner cube 60 and collimation of the telescope optical system 10 relative to the corner cube 60. It is desirable that the viewing angle of the first collimator optical system 30 be at least ten times of the viewing angle of the telescope optical system 10.

Figure 5:
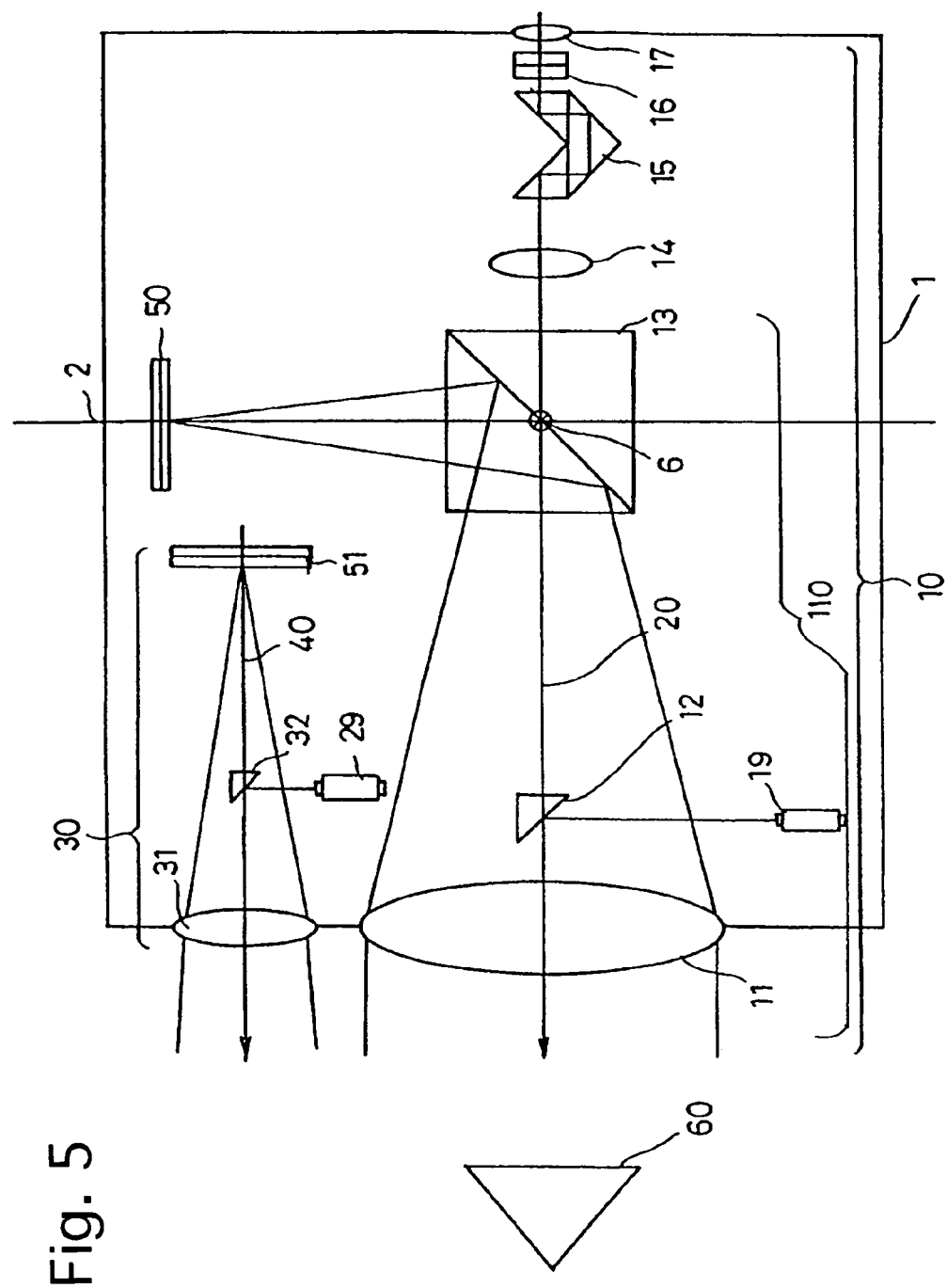
FIG. 5 is a view similar to that of FIG. 1 and illustrates an embodiment of the surveying instrument which is a modification of the first embodiment of the surveying instrument.

The above illustrated first embodiment of the surveying instrument shown in FIG. 1 can be modified as shown in FIG. 5. The surveying instrument shown in FIG. 5 is provided behind the right-angle prism 32 with a second image sensor 51 which is provided independently of the image sensor 50, and is not provided with any of the following three elements shown in FIG. 1: the beam splitter 33, the first shutter 18, and the second shutter 38. According to this structure, it is not necessary to control operations of two shutters, i.e., the first shutter 18 and the second shutter 38.

In this modification of the first embodiment of the surveying instrument, the target-recognition processing circuit 55 and the position-recognition processing circuit 59 are connected to the second image sensor 51. The target-recognition processing circuit 55 determines whether the second image sensor 51 receives light rays reflected by the corner cube 60. The target-recognition processing circuit 55 determines that the second image sensor 51 receives light rays reflected by the corner cube 60 when an image of the corner cube 60 is positioned within the field-of-view 41 of the first collimator optical system 30. The position-recognition processing circuit 59 determines a deviation of the position of an image of the corner cube 60 in the field-of-view 41 from the center of the field-of-view 41 in accordance with the output of the second image sensor 51 (i.e., in accordance with light rays reflected by the corner cube 60) when the target-recognition processing circuit 55 determines that the second image sensor 51 receives light rays reflected by the corner cube 60 (i.e., when an image of the corner cube 60 is in the field-of-view 41 of the first collimator optical system 30) and when the optical system to be used is switched from the first collimator optical system 30 to the second collimator optical system 110 or the telescope optical system 10. If the target-recognition processing circuit 55 determines that the second image sensor 51 receives no light rays reflected by the corner cube 60 while the position-recognition processing circuit 59 determines a deviation of the position of an image of the corner cube 60 in the field-of-view 41 from the center of the field-of-view 41, the surveying instrument body 1 is moved by the horizontal-direction drive system 56 and the vertical-direction drive system 57, each of which is connected to each of the target-recognition processing circuit 55 and the position-recognition processing circuit 59.

In the embodiments of the surveying instruments shown in FIGS. 1 and 5, the light rays used for collimating operation can be projected outwards by only one of the two light sources, i.e., either the light source 19 or the light source 29. It is possible for each of the embodiments of the surveying instruments shown in FIGS. 1 and 5 to be provided with neither the light source 19 nor the light source 29. In this case, the surveying instrument can be collimated relative to the corner cube 60 with ambient light rays reflected by the corner cube 60.

Figure 6:
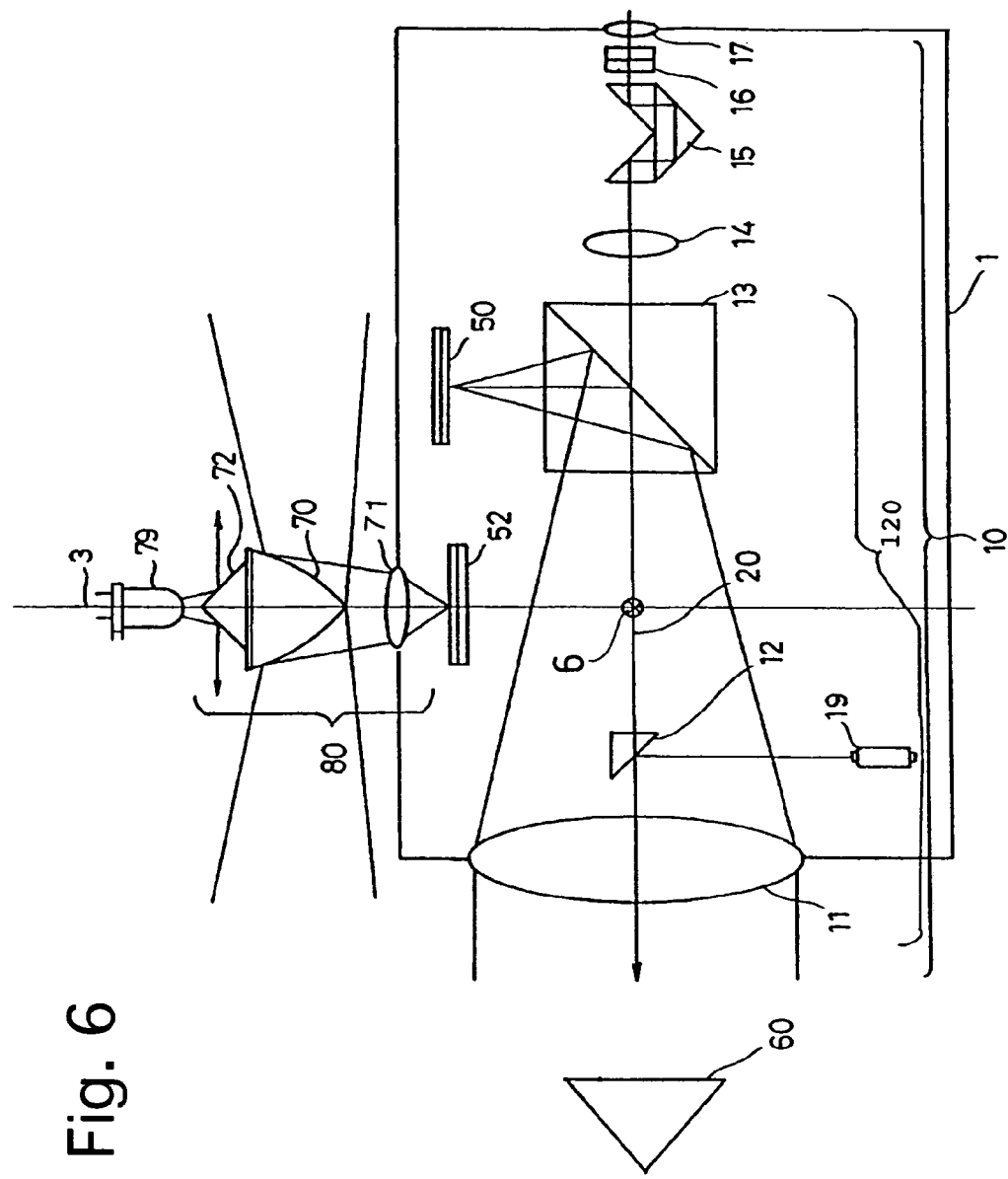
FIG. 6 is a view similar to that of FIG. 1 and illustrates a second embodiment of the surveying instrument according to the present invention.

FIG. 6 shows a second embodiment of the surveying instrument according to the present invention. In this embodiment, parts or elements similar to those in the first embodiment of the surveying instrument shown in FIG. 1 are designated by the same reference numerals.

As shown in FIG. 6, the surveying instrument is provided above the telescope optical system 10 with a first collimator optical system 80. A prism 72 is fixed on top of an all-directional mirror 70. Light rays which are emitted from a light source 79 are reflected by the prism 72 to be projected outwards from the surveying instrument. On the other hand, light rays which are incident on the all-directional mirror 70 are reflected thereby to be formed on an image sensor 52 through an image-forming lens 71. The surveying instrument body 1 can be rotated forward and reverse about a vertical axis 3, and can also be rotated forward and reverse about the horizontal axis 6. The vertical axis 3 is coincident with the optical axis of the first collimator optical system 80.

Similar to the telescope optical system 10 in the first embodiment of the surveying instrument, the telescope optical system 10 is constructed from an objective lens 11, a light source 19, a right-angle prism 12, a beam splitter (beam splitting prism) 13, a focusing lens 14, a Porro prism 15, a focusing screen 16 and an eyepiece 17. The second collimator optical system 120 is constructed from the objective lens 11, the light source 19, the right-angle prism 12 and the beam splitter 13. Accordingly, the second collimator optical system 120 share all the elements thereof with the telescope optical system 10.

In the second embodiment of the surveying instrument, the target-recognition processing circuit 55 and the position-recognition processing circuit 59 are connected to the image sensor 52.

A procedure of a collimating operation performed with the second embodiment of the surveying instrument will be hereinafter discussed with reference to FIG. 3. In this procedure, the corner cube 60 is placed at a survey point (step S1). Subsequently, the image sensor 52 is activated, and the light source 79 is turned ON to emit light toward the prism 72 to thereby project light rays toward the corner cube 60 for carrying out a collimating operation (step S2).

If the image sensor 52 receives light rays reflected by the corner cube 60 (if YES at step S3), it is determined that an image of the corner cube 60 is positioned within the field-of-view 41 of the first collimator optical system 80; based on this determination, the position of an image of the reflected light rays on the image sensor 52 is determined. On the other hand, if the image sensor 52 receives no light rays reflected by the corner cube 60 (if NO at step S3), it is determined that no image of the corner cube 60 is positioned within the field-of-view 41 of the first collimator optical system 80; based on this determination, the surveying instrument body 1 continues to be moved vertically until the image sensor 52 receives light rays reflected by the corner cube 60 (step S4). Upon the image sensor 52 receiving light rays reflected by the corner cube 60, the position of the reflected light rays on the image sensor 52 is determined.

Subsequently, the surveying instrument body 1 is moved horizontally and vertically in accordance with the positional information on the reflected light rays on the image sensor 52 to center the reflected light rays in the image sensor 52 (step S5). Subsequently, each of the light source 79 and the image sensor 52 is turned OFF. This makes it possible to bring light rays reflected by the corner cube 60 (survey point) into the field-of-view 21 of the telescope optical system 10 or the second collimator optical system 120.

Subsequently, a collimating operation is performed with either the telescope optical system 10 or the second collimator optical system 120, not with the first collimator optical system 80, which is used at step S3 to determine whether the image sensor 52 receives light rays reflected by the corner cube 60 (step S6).

This collimating operation, which is performed with either the telescope optical system 10 or the second collimator optical system 120, will be hereinafter discussed.

In the case where the collimating operation is performed manually, the operator rotates the surveying instrument body 1 horizontally and vertically while viewing an image of the corner cube 60 through the eyepiece 17 of the telescope optical system 10 so that the image of the corner cube 60 is positioned in the center of the field-of-view 21 (step S7).

In the case where the collimating operation is performed automatically, first of all, the image sensor 50 is activated, and the light source 19 is turned ON. Subsequently, the position of the reflected light rays of the corner cube 60 on the image sensor 50 which are incident thereon through the second collimator optical system 120 is detected, and the surveying instrument body 1 is rotated horizontally and vertically so that the image of the corner cube 60 is positioned in the center of the field-of-view 21 (step S7).

After the above described manual or automatic collimating operation is completed, a distance from the surveying instrument body 1 to the corner cube 60 and also horizontal and vertical angles can be measured with a position detector (not shown).

According to the second embodiment of the surveying instrument having the above described structure, the corner cube 60 can be detected just by moving the surveying instrument body 1 in the vertical direction because the first collimator optical system 80 can capture an all-round view (a 360-degree view) around the surveying instrument at the same time. This makes it possible to speed up the auto-collimating operation. It is possible for the collimating operation to be performed with the first collimator optical system 80, rather than the telescope optical system 10 or the second collimator optical system 120. The light rays used for the collimating operation can be projected outwards by only one of the two light sources, i.e., either the light source 19 or the light source 79. It is possible for the second embodiment of the surveying instrument to be provided with neither the light source 19 nor the light source 79. In this case, the surveying instrument can be collimated relative to the corner cube 60 with ambient light rays reflected by the corner cube 60. Other structures, actions and effects are the same as those in the first embodiment of the surveying instrument.

Figure 7:
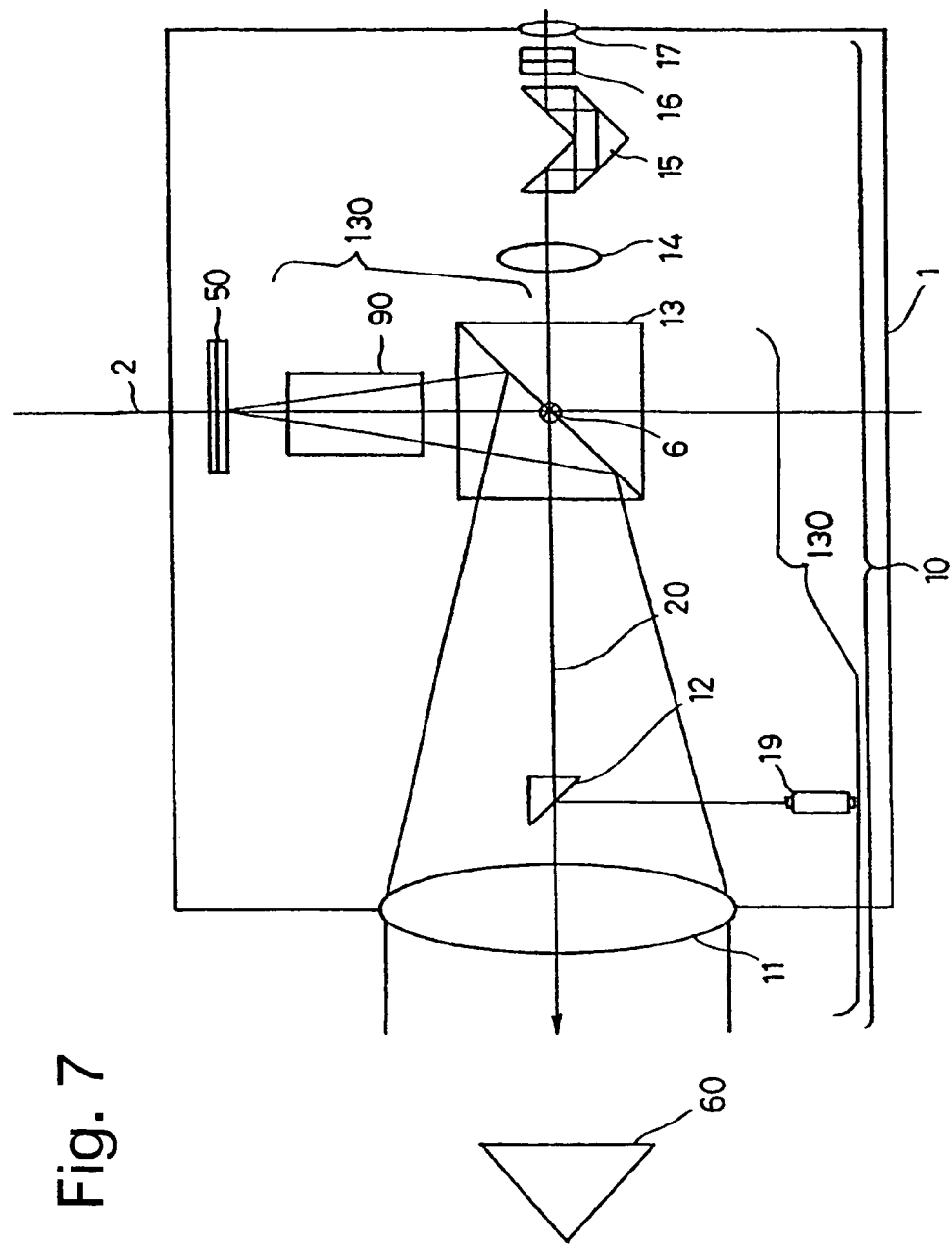
FIG. 7 is a view similar to that of FIG. 1 and illustrates a third embodiment of the surveying instrument according to the present invention.

FIG. 7 shows a third embodiment of the surveying instrument according to the present invention. In this embodiment, parts or elements similar to those in the first embodiment of the surveying instrument shown in FIG. 1 are designated with the same reference numerals.

As shown in FIG. 7, the third embodiment of the surveying instrument is provided with a collimator optical system 130 instead of the first collimator optical system 30 and the second collimator optical system 110, which are elements of the first embodiment of the surveying instrument shown in FIG. 1. The collimator optical system 130 is composed of an objective lens 11, a light source 19, a right-angle prism 12, a beam splitter (beam splitting prism) 13 and a zoom mechanism 90 including a zoom optical system (focal-length varying optical system). Accordingly, the collimator optical system 130 share the objective lens 11, the light source 19, the right-angle prism 12, and the beam splitter 13 with the telescope optical system 10.

In the collimator optical system 130, the collimator optical system 130 can vary the focal length thereof between wide angle and telephoto with the zoom mechanism 90, positioned between the beam splitter 13 and the image sensor 50. The light rays incident on the objective lens 11 are partly reflected by the beam splitter 13 to be formed as an image on the CCD image sensor 50 through the zoom mechanism 90. Accordingly, a single optical system can serve both as an optical system with a wide-angle view and an optical system with a narrow-angle view. This makes it possible to reduce the size of the surveying instrument.

A procedure of a collimating operation performed with the third embodiment of the surveying instrument will be hereinafter discussed. In this procedure, after the corner cube 60 is placed at a survey point, the image sensor 50 is activated, the zoom mechanism 90 is actuated so that the collimator optical system 130 is set to wide-angle, and the light source 19 is turned ON to emit light toward the right-angle prism 12 to thereby project light rays toward the corner cube 60 for carrying out a collimating operation.

If the image sensor 50 receives light rays reflected by the corner cube 60, it is determined that an image of the corner cube 60 is positioned within a field-of-view of the collimator optical system 130; based on this determination, the position of an image of the reflected light rays on the image sensor 50 is determined. On the other hand, if the image sensor 50 receives no light rays reflected by the corner cube 60, it is determined that no image of the corner cube 60 is positioned within the field-of-view of the collimator optical system 130; based on this determination, the surveying instrument body 1 continues to be moved horizontally and vertically until the image sensor 50 receives light rays reflected by the corner cube 60. Upon the image sensor 50 receiving light rays reflected by the corner cube 60, the position of the reflected light rays on the image sensor 50 is determined.

Subsequently, the surveying instrument body 1 is moved horizontally and vertically in accordance with the positional information on the reflected light rays on the image sensor 50 to center the reflected light rays in the image sensor 50. Subsequently, each of the light source 19 and the image sensor 50 is turned OFF. This makes it possible to bring light rays reflected by the corner cube 60 (survey point) into a narrow field-of-view of the telescope optical system 10 or the collimator optical system 130.

Subsequently, a collimating operation is performed with either the telescope optical system 10 or the collimator optical system 130.

This collimating operation, which is performed with either the telescope optical system 10 or the collimator optical system 130, will be hereinafter discussed.

In the case where the collimating operation is performed manually, the operator rotates the surveying instrument body 1 horizontally and vertically while viewing an image of the corner cube 60 through the eyepiece 17 of the telescope optical system 10 so that the image of the corner cube 60 is positioned in the center of the narrow field-of-view.

In the case where the collimating operation is performed automatically, first of all, the image sensor 50 is activated, the zoom mechanism 90 is actuated so that the collimator optical system 130 changes to telephoto, and the light source 19 is turned ON. Subsequently, the position of the reflected light rays of the corner cube 60 on the image sensor 50 which are incident thereon through the collimator optical system 130 is detected, and the surveying instrument body 1 is rotated horizontally and vertically so that the image of the corner cube 60 is positioned in the center of the narrow field-of-view.

After the above described manual or automatic collimating operation is completed, a distance from the surveying instrument body 1 to the corner cube 60 and also horizontal and vertical angles can be measured with a position detector (not shown). Other structures, actions and effects are the same as those in the first embodiment of the surveying instrument.

Figure 8:
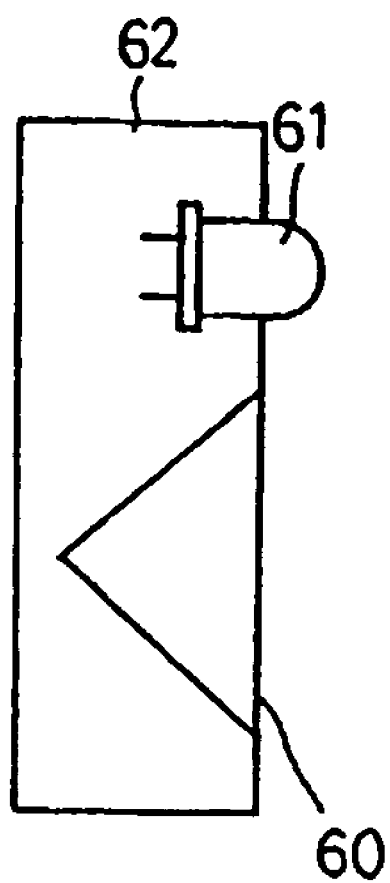
FIG. 8 is a schematic cross sectional view of a portion of an embodiment of the surveying instrument which is a modification of each of the first, second and third embodiments of the surveying instrument according to the present invention.

FIG. 8 shows a portion of an embodiment of the surveying instrument which is a modification of each of the above described first, second and third embodiments of the surveying instruments. In this modification, the corner cube 60 is accommodated in a box 62 placed outside the surveying instrument body 1, while a light source 61 is installed in the box 62. The light source 61 that is positioned adjacent to the corner cube 60 emits light to project light rays for collimating operation toward the surveying instrument body 1. The corner cube 60 can be detected by sensing the direct light rays emitted from the light source 61.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A surveying instrument, comprising:
   a surveying instrument body rotatable about each of a vertical axis and a horizontal axis; and
   a first collimator optical system comprising a first lens having a first optical axis and a second collimator optical system comprising a second lens having a second optical axis different from the first optical axis, each of said first and second collimator optical systems being positioned in said surveying instrument body to collimate said surveying instrument relative to a survey point, a viewing angle of said second collimator optical system being smaller than a viewing angle of said first collimator optical system,
   wherein a first collimating operation is performed with said first collimator optical system before a second collimating operation is performed with said second collimator optical system, and each of said first and second collimator optical system comprise a separate light source for projecting light rays toward said survey point to collimate said surveying instrument relative to said survey point.

2. The surveying instrument according to claim 1, further comprising an image sensor,
   wherein said second collimator optical system is capable of forming an image on said image sensor.

3. The surveying instrument according to claim 2, further comprising an auto-collimating system which drives said surveying instrument body to rotate about each of said vertical axis and said horizontal axis to position an image of a target at said survey point within a field-of-view of said first collimator optical system.

4. The surveying instrument according to claim 3, wherein said first collimator optical system and said second collimator optical system share the use of said image sensor.

5. The surveying instrument according to claim 1, wherein said first collimator optical system comprises an all-directional mirror.

6. A surveying instrument, comprising:
   a surveying instrument body rotatable about each of a vertical axis and a horizontal axis; and
   a collimator optical system which is positioned in said surveying instrument body to collimate said surveying instrument relative to a survey point, wherein said collimator optical system comprises a zoom mechanism for varying a focal length of said collimator optical system from that of a wide-angle view to that of a telephoto view.

7. A surveying instrument comprising:
a surveying instrument body rotatable about each of a vertical axis and a horizontal axis;
a telescope optical system positioned in said surveying instrument body, comprising a first lens having a first optical axis; and
a collimator optical system positioned in said surveying instrument body, comprising a second lens having a second optical axis different from the first optical axis, a viewing angle of said collimator optical system being greater than a viewing angle of said telescope optical system,
wherein said surveying instrument body is driven to rotate about each of said vertical axis and said horizontal axis to position an image of a target at a survey point within a field-of-view of said telescope optical system in accordance with positional information on said survey point which is obtained through said collimator optical system, and each of said collimator optical system and said telescope optical system comprises a separate light source for projecting light rays toward said survey point to collimate said surveying instrument relative to said survey point.

8. The surveying instrument according to claim 7, further comprising:
an image sensor; and
an auto-collimating system which drives said surveying instrument body to position said image of said target at said survey point within a field-of-view of said telescope optical system in accordance with positional information on said survey point which is obtained through said collimator optical system.

9. The surveying instrument according to claim 8, wherein said collimator optical system is positioned to be capable of forming said image of said target on said image sensor.

10. A surveying instrument comprising:
a surveying instrument body rotatable about each of a vertical axis and a horizontal axis;
a first automatic collimator optical system and a second automatic collimator optical system each of which is positioned in said surveying instrument body to collimate said surveying instrument relative to a survey point, a viewing angle of said second collimator optical system being smaller than a viewing angle of said first collimator optical system;
and a target recognition processing circuit that automatically determines whether a survey point is within a field of view of the first collimator optical system,
wherein a first collimating operation is performed with said first collimator optical system before a second collimating operation is performed with said second collimator optical system, said first collimating operation is automatically performed when said target recognition processing circuit determines that a survey point is within the field of view of the first collimator optical system, and said surveying instrument body automatically moves if said target recognition processing circuit determines that a survey point is not within the field of view of said first collimator optical system.

11. A surveying instrument comprising:
a surveying instrument body rotatable about each of a vertical axis and a horizontal axis;
a first collimator optical system comprising a first lens having a first optical axis;
a second collimator optical system comprising a second lens having a second optical axis different than the first optical axis, each of said first and second collimator optical systems being positioned in said surveying instrument body to collimate said surveying instrument relative to a survey point, a viewing angle of said second collimator optical system being smaller than a viewing angle of said first collimator optical system; and
an image sensor which captures images from said first collimator optical system and said second collimator optical system,
wherein a first collimating operation is performed with said first collimator optical system before a second collimating operation is performed with said second collimator optical system.

* * * * *